US010728605B1

(12) United States Patent
Jones et al.

(10) Patent No.: US 10,728,605 B1
(45) Date of Patent: Jul. 28, 2020

(54) MEDIA PLAYER CONTROL DEVICE

(71) Applicant: Utility Design, Inc., Thousand Oaks, CA (US)

(72) Inventors: Michael Wayne Jones, Thousand Oaks, CA (US); Quinn Kazuo Jones, Thousand Oaks, CA (US)

(73) Assignee: Utility Design, Inc., Thousand Oaks, CA (US)

( * ) Notice: Subject to any disclaimer, the term of this patent is extended or adjusted under 35 U.S.C. 154(b) by 0 days.

(21) Appl. No.: 16/737,794

(22) Filed: Jan. 8, 2020

Related U.S. Application Data

(60) Provisional application No. 62/800,902, filed on Feb. 4, 2019.

(51) Int. Cl.
*H04N 21/422* (2011.01)
*H04N 21/472* (2011.01)

(52) U.S. Cl.
CPC ... *H04N 21/4221* (2013.01); *H04N 21/47217* (2013.01)

(58) Field of Classification Search
None
See application file for complete search history.

(56) References Cited

U.S. PATENT DOCUMENTS

| | | |
|---|---|---|
| 4,809,117 A | 2/1989 | Friedman |
| 4,976,435 A | 12/1990 | Shatford et al. |
| 5,148,152 A | 9/1992 | Stueckle et al. |
| 6,689,947 B2 | 2/2004 | Ludwig |
| 8,672,761 B2 | 3/2014 | Kidakarn |
| 9,002,680 B2 | 4/2015 | Nurse et al. |
| 2005/0156878 A1 | 7/2005 | Logue |
| 2008/0129683 A1 | 6/2008 | Li |
| 2008/0183911 A1* | 7/2008 | Hurley ............... G08C 17/00 710/15 |
| 2009/0013252 A1* | 1/2009 | DeWitt ............... G11B 27/034 715/716 |
| 2010/0285779 A1* | 11/2010 | Yeh ............... H04W 84/027 455/413 |
| 2011/0199393 A1 | 8/2011 | Nurse et al. |

(Continued)

OTHER PUBLICATIONS

World Intellectual Property Organization, International Search Report and Written Opinion for International Application No. PCT/US2020/016175, dated May 7, 2020, pp. 1-12.

*Primary Examiner* — Hsiungfei Peng
(74) *Attorney, Agent, or Firm* — Socal IP Law Group LLP; Angelo Gaz; Steven Sereboff

(57) ABSTRACT

There are disclosed devices, system and methods for a control device that controls a media player of a computer. The control device includes a circuit and various actuators that can be used to control the player. The actuators may be located in a pattern to be and may be configured to be activated by being stepped on. The control device sends loop in, loop out and a loop clear commands to the player upon receiving signals from a loop actuator. It also sends first speed, a second speed, a third speed, and a speed clear commands to the player upon receiving signals from a speed actuator. It sends pause, play and a global reset commands to the player upon receiving signals from a play/pause actuator. It may send skip backward and skip forward commands to the media player upon receiving signals from skip backward or skip forward actuators.

16 Claims, 7 Drawing Sheets

(56) References Cited

U.S. PATENT DOCUMENTS

| | | |
|---|---|---|
| 2011/0251852 A1 | 10/2011 | Blas |
| 2011/0275436 A1 | 11/2011 | Kidakarn |
| 2012/0282987 A1 | 11/2012 | Romero |
| 2015/0194179 A1 | 7/2015 | Smith |
| 2017/0239550 A1 | 8/2017 | Fernando et al. |

* cited by examiner

MEDIA PLAYER CONTROL DEVICE

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent claims priority from provisional patent application 62/800,902, filed Feb. 4, 2019, titled ELECTRONIC FOOD PEDAL FOR CONTROL OF COMPUTER, MOBILE, IOS AND SMART TECHNOLOGY DEVICES which is incorporated herein by reference.

BACKGROUND

Field

This disclosure relates to a media player control device for controlling the playing of media by a media player of a computing device.

Description of the Related Art

Interest in and use of local and online streaming instructional, educational and entertainment videos and audio software (e.g., playing of media) has surged in recent years. Users representing a broad range of ages, interests and abilities now use these formats to study, learn and enjoy a variety of media, skills and disciplines. In addition, professionals use these videos; and industry standard video, audio and graphic editing software as tools in their work as well.

However, while performing the work, it may be difficult to control the playing of media, such as to skip back and replay a section of the media. For example, many of these areas of interest and work require the use of two hands while engaging in a particular activity. A musician learning to play the guitar (or piano), the medical student practicing a surgical procedure or a homeowner repairing a household appliance all require the use of both hands while viewing an instructional video or interacting with audio or video editing and recording software. In other cases, such as cooking or automobile repair, the user may be handling tools, materials or oils which could harm or affect the functioning of hand controlled devices. A challenge for these users is the break in continuity of the activity process when one must set down an object or clean their hands before using or controlling the play of a hand-held device. In many local and online medial streaming situations, using a keyboard, keypad, mouse or trackpad is not only inconvenient but an impractical interruption of the concentration and/or work at hand.

Much more difficult for controlling the playing of media are the challenges faced by users who suffer from physical limitations or symptoms of conditions such as rheumatoid arthritis, stroke or Parkinson's disease. In these cases, the issue is not one of inconvenience, but inaccessibility. Here, a hand-held media player control device makes engagement with and ease of use of the media controller very difficult for this community of users. An additional drawback of hand manipulated computer interaction is that two separate controller devices are required to access all of the playback functions of streaming applications. Online video and audio streaming services such as YouTube and Spotify have made keyboard commands available for video playback functions such as "Skip Backward" and Skip Forward", while other useful functions such as adjustment of video playback speed are only accessible through a drop-down menu via mouse or trackpad.

What is desired is a single, non-hand-held device which controls various functions of video and audio applications (e.g., media players) on computers, mobile devices and smart technology devices (e.g., computing devices).

Figure 1:
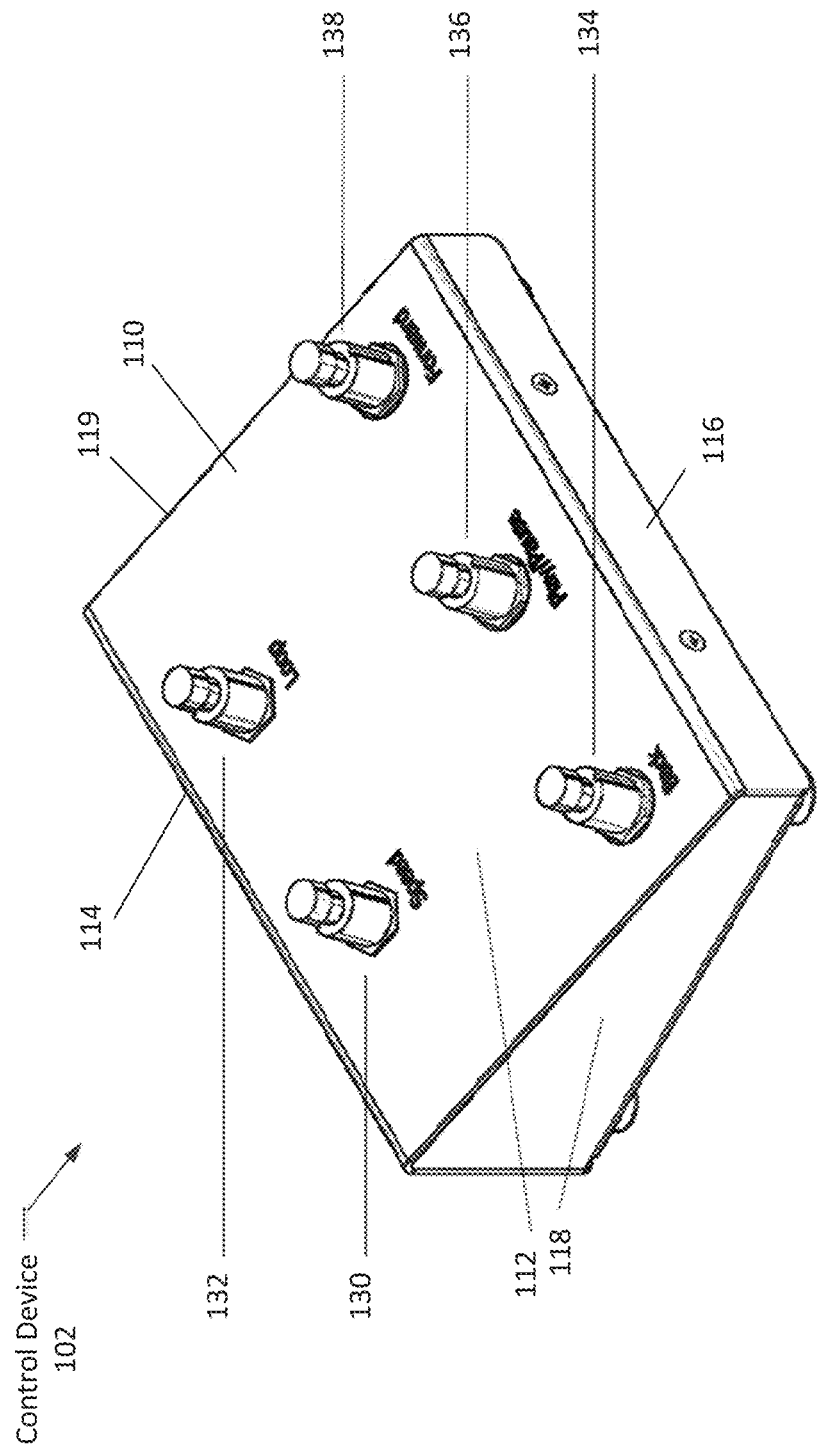
FIG. 1 is an elevational perspective view of a media player control device for controlling the playing of media by a media player of a computing device.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Devices, system and methods herein are for an electronic foot pedal device which controls various functions of media players of computing devices. Thus, the foot pedal device can control the playing of media by the media player. More specifically, a foot pedal media player controller allows a user to access and control a variety of standard and non-standard functions of media players (e.g., computer, smart technology and mobile software applications; video and audio players and other application interfaces). The pedal device allows for standard functions such as play, pause, rewind (or skip back), fast-forward (or skip forward) and custom functions such as continuously looped playback of video and/or audio between user selectable start and end points and the ability to slow the playback speed of media (e.g., video and/or audio) to at least three different, slow playback speeds. It may have five or more programmable foot actuated switches (e.g., actuators) that control the standard and custom functions of the media player.

For example, ON signals from speed, loop, back, play/pause and forward actuators may be translated by a control circuit of the foot pedal device into various speed, loop, back, play/pause and forward commands sent by the device to the computing device having the media player. When these commands are received by the computing device, they cause the player to execute various media speed, loop, back, play/pause and forward playback functions that control the playing of the media. The computing device and/or player may translate the received commend into the playback functions.

Other user-definable commands may be available through hardware, firmware and software updates to the device and/or browser extension. Communication between the electronic foot pedal device and an external computing device (e.g., a user computing device such as a desktop or laptop computer, tablet computer, smart television, smartphone or the like) can be made via a USB cable and/or wireless connection. The wireless connection may be a standard short-range wireless interconnection device such as RFCOMM serial port emulation or Bluetooth serial port profile technology. The functionality between the foot pedal device and the computing device can be accomplished through use of updatable firmware, internet browser software extensions, API's and/or other software applications.

Technologies described herein provide a media player control device for controlling a media player of a computing device. The media player control device includes a control circuit coupled to a loop actuator, a speed actuator, a play/pause actuator, a skip back actuator and a skip forward actuator. The control circuit sends loop control commands to the media player upon receiving ON signals from the loop actuator. The loop control commands may include a loop in command, a loop out command and a loop clear command. The control circuit also sends speed control commands to the media player upon receiving ON signals from the speed actuator. The speed control commands may include a first speed command, a second speed command, a third speed command, and a speed clear command. The control circuit may send play/pause control commands to the media player upon receiving ON signals from the play/pause actuator. The play/pause control commands include a pause command, a play command and a global reset command. Next, the control circuit may send a skip backward command to the media player upon receiving an ON signal from the skip backward actuator. In some cases, the control circuit may send a skip forward command to the media player upon receiving an ON signal from the skip forward actuator.

Description of Apparatus

Figure 2:
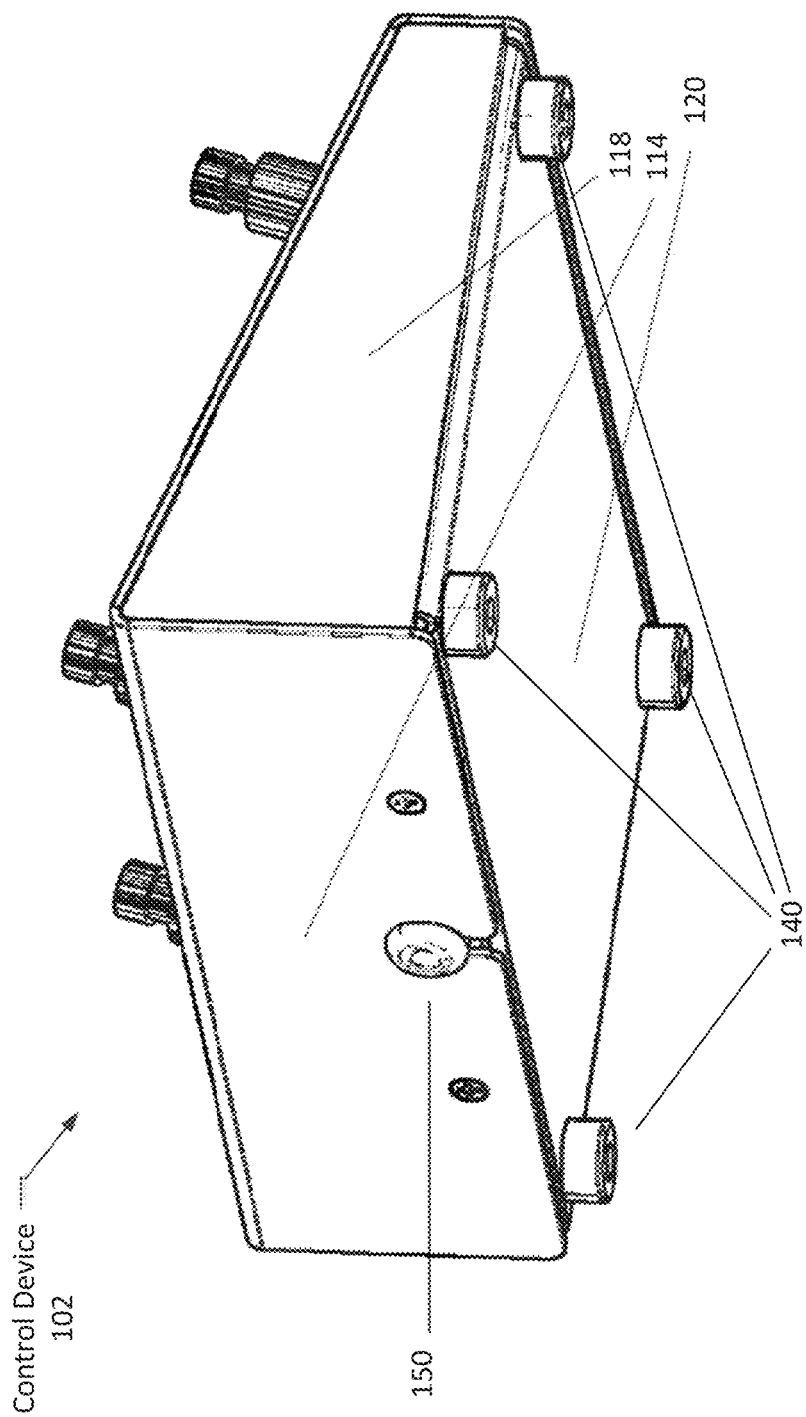
FIG. 2 is a perspective view of the bottom, left side and back side of the media player control device of FIG. 1.

Referring now to FIG. 1, a top perspective view 100 of media player control device 102 for controlling the playing of media by a media player that plays the media on a computing device. Referring next to FIG. 2, a bottom perspective view 200 of the media player control device 102 of FIG. 1. For example, media player device 102 may be a foot pedal device for placing on a floor surface that has actuators 130-138 that are located in a pattern to be stepped on and that are configured to be activated by being stepped on. The actuators can be easily activated by a human foot to control the playing of media on Youtube or another media player by a computer. Being located in a pattern to be stepped on may be each actuator being spaced apart from each other actuator by at least a distance that allows most human feet (e.g., say below men's size 15 in the United States) to independently activate each button without activating another button. Being configured to be activated by being stepped on may be each actuator having a top button or surface that activates the actuator when pushed down with enough force move it beyond a threshold or to click it. The actuators may be difficult to activate with a finger, but may be easily activated by being stepped on, such as for actuators of an effects foot pedal for playing electronic guitars or another electrical musical instrument.

For instance, device 102 may be an electronic foot pedal for controlling playing of media by user computing devices such as mobile devices, IOS and smart technology devices. Also, as noted herein, the concepts described for device 102 may be applied to various forms of media player control devices, other than a foot pedal device, such to a controller with actuators, a port and a controller circuit that is a hand-held device, that has a touchscreen or one that is optically activated by eye movement. In some cases, the concepts may be applied to a controller with actuators, a port and a controller circuit to control, for example, industrial hardware such as drill presses, lathes, conveyors and the like.

The device 102 includes housing 110 having top surface 112, back surface 114, front surface 116, left side surface 118, right side surface 119 and bottom surface 120. The device 102 has pads or padded feet 140 on the bottom surface. The padded feet may be made of rubber, felt, plastic and the like. They are optional and can be excluded.

In this embodiment, the top surface 112 is angled down from the back to the front surface. It can be appreciated that the top surface may be flat or not angled; or have another angle. The housing may be a top section which is angled to form the front and back of the device and a bottom section which is angled to form the sides of the device.

The device 102 includes 5 actuators which may be electromechanical switches, buttons, On/Off push-button foot switches or other actuators capable of translating physical pressure on the switch into an ON signal from an OFF signal. Each switch may transfer a user's push into an ON signal for controlling device 102 and/or the media player (e.g., or computing device 412). The push may be an intentional push of the actuator by a user's foot in order to control a media player's play of a media.

Specifically, mounted in surface 112 are the loop actuator 132, speed actuator 130, play/pause actuator 136, skip backward actuator 134 and skip forward actuator 138 which are located in a pattern to be stepped on and are configured to be activated by being stepped on by a person. For example, the size of housing 110, location of actuators 130-138 on surface 112 and angle of surface 112 (e.g., with respect to the floor surface) may be configured so that the loop actuator, speed actuator, play/pause actuator, skip backward actuator and skip forward actuator are located in a pattern to be stepped on and that are configured to be activated by being stepped on by a person or user of device 102 and of device 410.

Each of the actuators 130-138 may be separated from each of the other ones of actuators 130-138 by a distance so that it can be independently and intentionally stepped on without mistakenly stepping on another of the actuators. Being located in a pattern to be stepped on may be each actuator being spaced apart from each other actuator by at least a distance that allows most human feet (e.g., say below men's size 15 in the United States) to independently activate each button without activating another button. Being configured to be activated by being stepped on may be each actuator having a top button or surface that activates the actuator when pushed down by a human foot with enough force move it beyond a threshold or to click it. The actuators may be difficult to activate with a human finger, but may be easily activated by being stepped on, such as for actuators of an effects foot pedal for playing electronic guitar player or another electrical musical instrument.

In some cases, the actuator is in an OFF position and outputs an OFF (or no) signal until it is pressed with a threshold amount of pressure which translates it to an ON position at which it outputs an ON signal. After achieving the ON position, the actuator may continue to output the ON signal until the pressure is released below the threshold and it transitions back to the OFF position at which it switches back to outputting the OFF signal. The threshold amount of pressure may be typical for a switch of a typical musical foot pedal device switch.

Device 102 is shown having a speed actuator 130, a loop actuator 132, a skip back actuator 134, a play/pause actuator 136 and a skip forward actuator 138. Each actuator may be mounted to or on the housing, such as extending through a hole in the housing, having an anchor portion below the opening that is larger than the hole and having a locking portion (e.g., threads engaged by a nut) that holds the housing around the opening between the anchor portion and the locking portion. Each actuator may be mounted as known for mounting a foot switch in musical effects pedal device. The mountings may be by threads around the outer surface of the actuators that are engaged with nuts.

In the figure, the bottom row of actuators are the Skip Back, Play/Pause and Skip Forward actuators; and the top row are Speed Adjustment and Loop function actuators. However, it is considered that the actuators can be arranged differently such as by switching the bottom and top rows; and/or switching the left to right order. Each actuator may be independently accessible to being pressed by a user's foot, shoe or toes.

The material of the housing may be a rugged material such as aluminum and/or steel. It may be or include various other materials such as plastic, rubber, wood and foam.

Device 102 is shown having communication port 150 for sending or transmitting communication signals to the computing device. Port 150 may be a USB cable, USB cable connector, other wired connection or a wireless connection device. The USB cable connector may be a grommet for a USB cable connector. The wireless connection may be a standard short-range wireless interconnection device such as RFCOMM serial port emulation or Bluetooth serial port profile technology. The device 102 may be powered by a USB or other connection to port 150. It may be power by a cord to a wall plug. It may be powered by a battery within the device 102.

Figure 3:
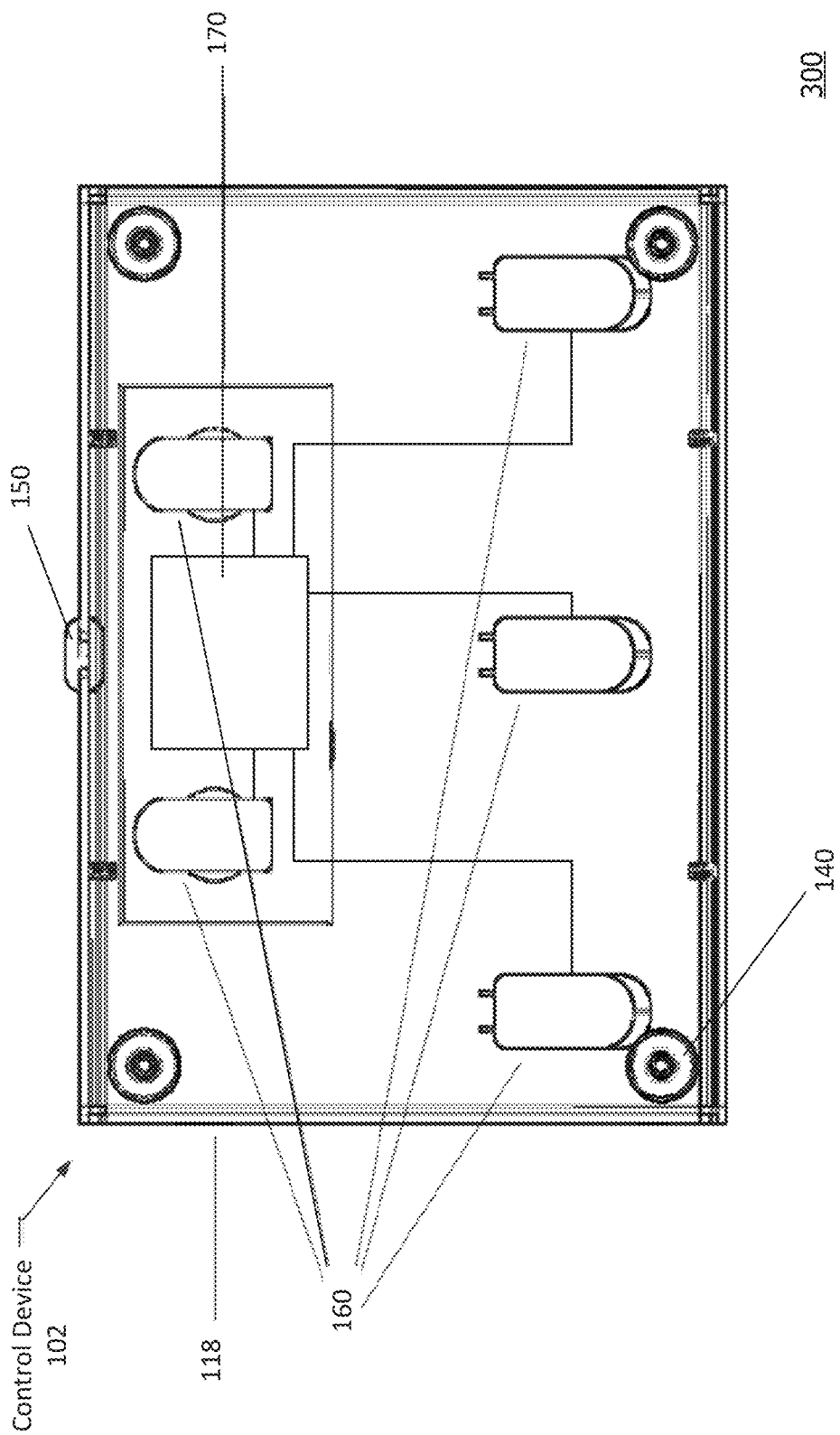
FIG. 3 is a bottom cross sectional view of the media player control device of FIG. 1.

Referring now to FIG. 3, a bottom cross sectional view 300 of the media player control device 102 of FIG. 1. View 300 shows the location of the internal parts 160 of actuators 130-138 and control circuit 170. Each of the parts 160 is electronically coupled to the circuit 170 by a wired (e.g., shown) or wireless (not shown) connection to send the OFF and ON signals to the circuit 170. FIG. 3 shows a wired connection such as a wire or PCB trace capable of transmitting the actuator ON and OFF signals from each actuator to the circuit 170. This connection does not have to be internal, but can be within (e.g., conducting traces insulated from other conductors of the housing) or external to (e.g., insulated traces on the surface of or outside the surface of) the housing.

A control circuit 170 of the foot pedal device translates the speed, loop, back, play/pause and forward ON signals it receives from the different speed, loop, back, play/pause and forward actuators into speed, loop, back, play/pause and forward commands that it sends to the computing device using port 150. The control circuit 170 can have updatable firmware and/or software for updating or changing the speed, loop, back, play/pause and forward commands. It is considered that there may be more or fewer than 5 actors and that circuit 170 may send commands for those actuators. In some cases, only the loop, speed and play/pause actuators and commands may exist. In one case only the loop and speed actuators and commands exist.

Control circuit 170 may be or include hardware and/or software. The hardware may be or include a microprocessor, an integrated circuit (IC) chip, electronic logic, electronic circuitry, printed circuit boards, ROM, and/or a BIOS. The software may be non-transitory memory and/or RAM having instructions executed by a processor of the circuit 170. Control circuit 170 may be or include RAM, ROM, DRAM, SRAM and MRAM, and may include firmware, such as static data or fixed instructions, BIOS, system functions, configuration data, and other routines used during the operation of the computing device. Control circuit 170 may be computing device 800 as noted below. The circuit 170 may be mounted to and secured to the housing by its connection to the top two On/Off switches 130 and 132 which are mounted to the housing.

In some cases, the housing 110 may be shaped as a foot pedal device for positioning on a floor surface. The loop, speed, play/pause, skip back and skip forward actuators 130-138 may be mounted in a top surface 112 of the housing. The control circuit 170 may be disposed within the housing; and the communication port 150 may be for sending the control commands from the control circuit 170 to the media player 414 using one of a USB connection or wireless technology.

In some cases, control device 102 may be or include a computing device 700. In some cases, control circuit 170 may be or include a computing device such as noted for computing device 700.

Figure 4:
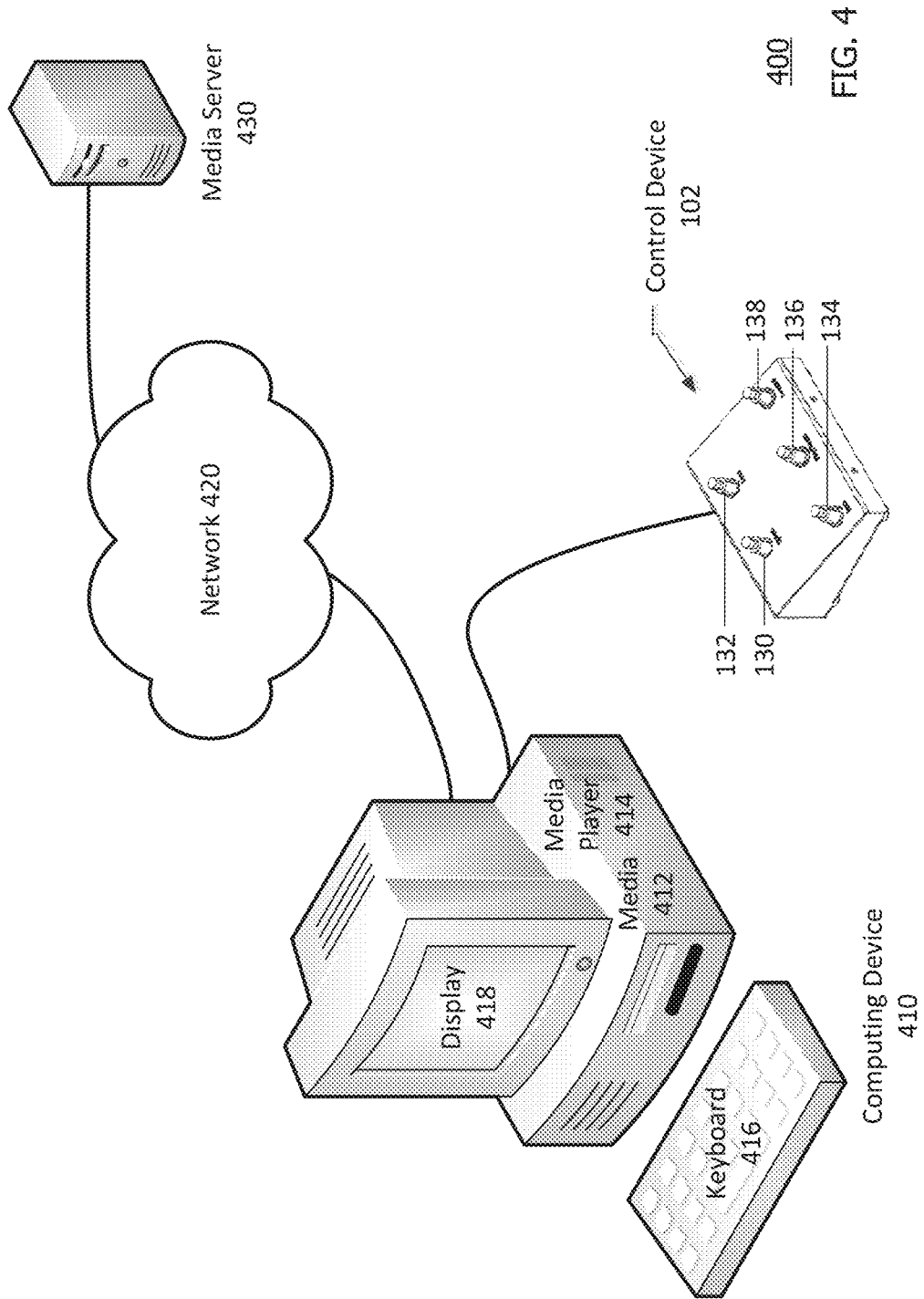
FIG. 4 is a system having a media player control device for controlling the playing of media by a media player of a computing device.

FIG. 4 is a system 400 having a media player control device 102 for controlling the playing of media 412 by a media player 414 of a user computing device 410. The computing device includes media 412 which is played by media player 414. Various other media players of device 410 or other computing devices may play media 412.

Communication between the electronic foot pedal device 102 (e.g., port 150) and external computing device 410 (e.g., a user computing device such as a desktop or laptop computer, tablet computer, smart television, smartphone or the like) can be made via a USB cable and/or wireless connection. The wireless connection may be a standard short-range wireless interconnection device such as RFCOMM serial port emulation or Bluetooth serial port profile technology.

The computing device 410 may be or include computing devices, computers, mobile devices and smart technology devices used by the user of the media player control device 102 to view on display 418 and/or hear (e.g., via a speaker or headset) the media 412. The computing device 410 and/or player 414 can translate the speed, loop, back, play/pause and forward commands received from port 150 of the foot pedal device 102 into the speed, loop, back, play/pause and forward playback functions using internet browser software extensions, API's and/or other software applications installed on the computing device.

The computing device 410 may also have updateable software (e.g., the updatable internet browser software extensions and/or other media player 414 software) which, through modification, can allow for alteration and editing of speed, loop, back, play/pause and forward control functions and commands to suit the tools and functions of various media players (e.g., various media playing software programs 414). In some cases, media player 414 is a Google Chrome browser having an added extension that the user of device 102 can install onto the computer 410 so that the pedal device 102 can communicate the commands to the browser.

The extension can be setup to conditionally fire a script on certain web pages, for example Vimeo or Youtube. The script it fires adds a "key listener" to the web page that checks if user is pressing certain keys/actuators 130-138, such as of a keyboard, I/O or other input device. A switch/actuator being pressed on device 102 sends a keypress event from circuit 170 to the browser, which triggers the key listener to perform whatever function is sent by circuit 170 depending on the key/actuator pressed. There are different functions for each keypress/actuator, i.e. skip back, loop, play/pause, slow down, etc. The media player may be another browser such as Internet Explorer, Firefox or the like; and may have a similar extension for communicating with the device 102.

The media 412 may be local, online and/or streaming audio and/or video media. In some cases, it is video media (e.g., images and audio that progress over time). Media 412 may be media (streaming or file) from any network source, such as a server, another computing device and/or the cloud. Medial 412 may also be media (streaming or file) from any local source, such as a CD, DVD, blue ray, thumb drive, flash card and the like.

The computing device 410 includes keyboard 416 which may represent various input and output devices (e.g., I/O devices), such as a keyboard and mouse. Keyboard 416 may be used to control the playing of media 412 by the media player 414 but may not be able to send loop and/or slow commands.

The media player 414 may be a video and/or audio player or application; a smart technology, a mobile software application and/or an application interface used by the user (e.g., via or through control device 102) to control the playing of the media 412. The media player 414 may be a Browser, Media Interface or Media Source. It may have a custom extension as noted herein. The extension may be downloaded, accessed and/or provided by various software and application processes as known. The foot pedals 130-138 may be or include actuators or pressure switches that can be activated or pressed by a foot of the user to control the playing of the media 412 by player 414. In some cases, these actuators or pressure switches require more pressure or force to be activated by the user than is typical for a person pressing a key of keyboard or typing on a keyboard (or for activating a mouse button). In some cases, they are easily activated by being stepped on by a person's foot but are very difficult for a person to activate manually.

Display 418 may be a display for displaying the playing of media 412 as known. It may include a video display (e.g., screen or monitor) and/or audio output (e.g., speaker or headset port). It may include both a display and audio output.

System 400 includes media server 430 coupled to device 410 through network 420. Server 430 may be any of numerous remote or streaming sources of media or media files (e.g., for download) as known. Network 420 may be or include various wired and/or wireless network technology as known. It may be or include the Internet.

Computing device 410 may be a user computing device having and playing (e.g., executing by a processor and displaying/audio) media 412 using the media player 414 controlled by the media player controller device 102. The media player 414 may also be controlled by other devices including keyboard 416. In some cases, the media player 414 is controlled by device 102 and keyboard 416. In some cases, the media player 414 is controlled only by device 102 and keyboard 416.

Description of Processes

In some embodiments, when one of the five actuators/switches 130-138 is depressed, an electrical circuit is closed, thereby sending an "ON" signal to the control circuit 170 which, in turn, translates the incoming signal into one of several programmable commands. The command is sent from the circuit 170 via the port 150 which may be a USB port or via a wireless transceiver for output to a connected computing device 410 (e.g., a computer, a mobile device and/or a smart device). Upon receiving the recognized command, the computing device 410 executes a standard function by media player 414 such as Play, Pause, Skip Forward five seconds or Skip Backward five seconds on media 412. In some cases, non-standard functions by the media player 414, such as Speed Adjustment and Loop (Repetitive cycling of a user selectable segment of the video) require additional translation of the pedal command via a customized internet browser extension tool or other software/firmware of the device 410 and/or player 414 in order to execute the chosen video function. The non-standard function pedal command may be a loop command or a speed command that is interpreted by the player using the extension in order to create the loop or speed function. Software extensions for the Chrome, Safari and Firefox internet browsers and audio streaming applications such as Spotify can be custom coded to recognize data from the circuit 170 and translate this data into commands. Other custom functions may be available for local software applications such as Logic, ProTools, Final Cut Pro, etc. In other cases, the non-standard functions, such as Speed Adjustment and Loop do not, require additional translation of the pedal command via a customized internet browser extension tool or other software/firmware.

Figure 5:
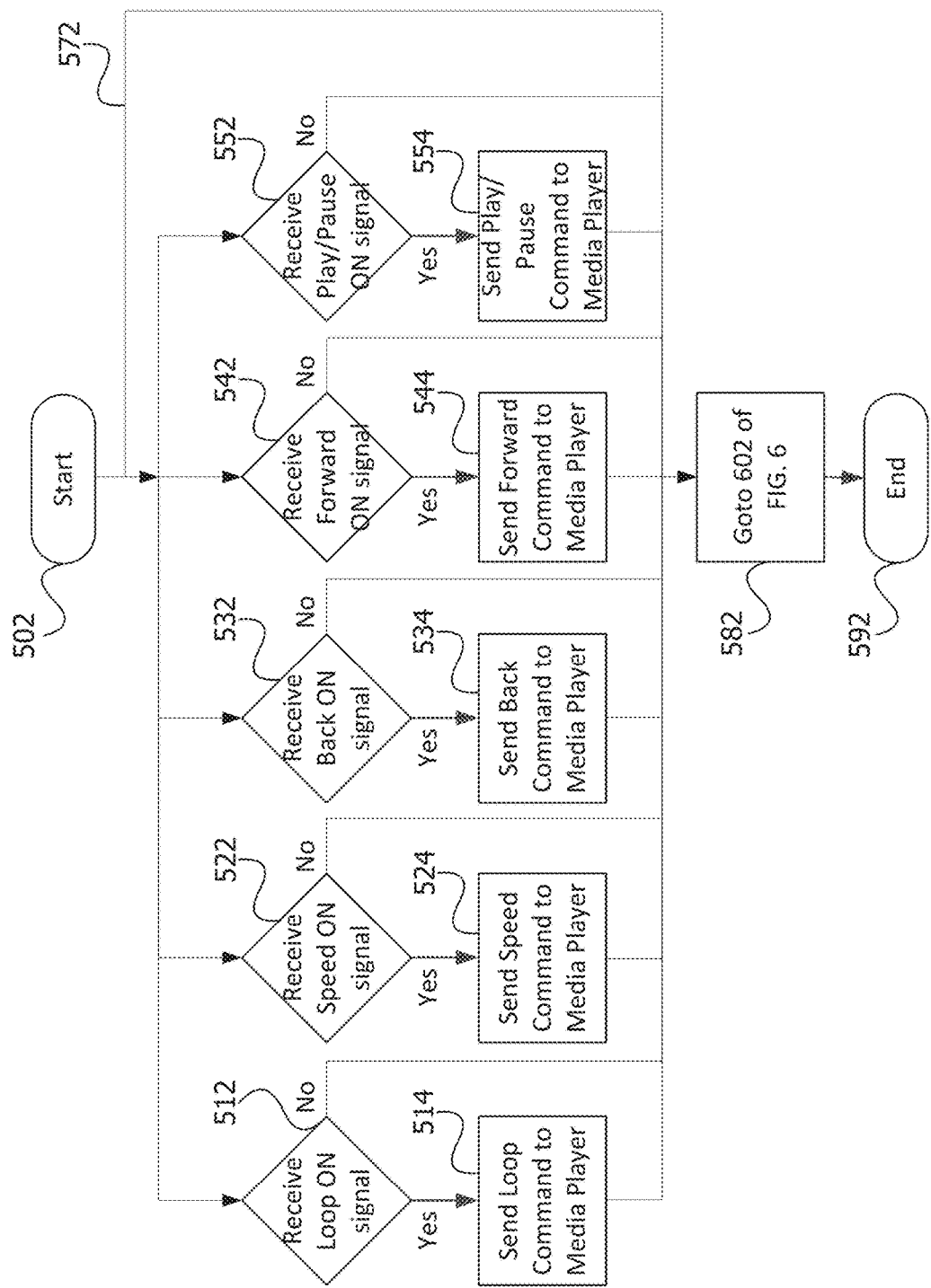
FIG. 5 is an operating environment/process for a media player control device controlling the playing of media by a media player of a computing device.

FIG. 5 is an operating environment/process 500 for a media player control device 102 controlling the playing of media 412 by a media player 414 of a computing device 410. Process 500 is performed by control device 102. It may be performed by control circuit 170. Process 500 begins at 502 and ends at 592 but can optionally be repeated, such as shown by the arrow 572 returning to 502. Process may also go to 602 at 582. Going to 602 at 582 is an option and not performed for some embodiments. For example, process 500 can be repeated at arrow 572 without including performing any of process 600. Here, the device 102 and/or controller 170 are sending commands but computing device 410 is not required or used. In other cases, process 600 is performed during or prior to each time arrow 572 is performed (e.g., process 500 returns to 502 and end 592 is not performed).

At 512 it is determined whether a loop ON signal has been received. Determining at 512 may be circuit 170 detecting, monitoring for or otherwise receiving a signal from loop actuator 132 indicating or as a result of the actuator being activated (e.g., pressed or stepped on). If the loop ON signal is detected at 512, the process continues to 514 where control circuit 170 sends (e.g., using port 150) a loop control command to the media player 414 (e.g., through device 410).

The loop control command may be or include a loop in command, a loop out command and a loop clear command. Sending the loop control commands at 514 may include control circuit 170 translating a sequence of ON signals received from the loop actuator 132 to the loop in, loop out and loop clear commands, and transmitting those commands to the media player. For example, the control circuit 170 may translate a first ON signal (e.g., received over time) from the loop actuator 132 to the loop in command, translate a second ON signal to the loop out command, and translate a third ON signal to the loop clear command. After the third ON signal is received, this sequence may repeat by interpreting a fourth ON signal as the first ON signal. In some cases, the loop control commands do not include the loop clear such as where the global reset at 552 is instead used to clear loops.

The loop in command may be configured to cause the media player (e.g., when received) to execute a loop in point function that marks a first user selected point in time of the media, at the current location in media being played by the media player. The loop out command may be configured to cause the media player (e.g., when received) to execute a loop out point function that marks a second, later user selected point at the current location in the media being played by the media player, and causes the current location to loop back to the first user selected point now and each time the current location moves to the second user selected point. That is, the user may use the loop in command may cause the media player mark a first point in time of the media and use the loop out command to mark a later point in time of the media at which playing of the media will loop back to the first point of time and replay a loop of media from the first to the second point of time. The loop may be shorter in time than or less than the total playing time of the media.

This may be a repetitive cycling segment of a media being played by the media player. The loop clear command may be configured to cause the media player to execute a loop clear point function that removes the first and second user selected points and allows the media to play through the second user selected point.

If the loop ON signal is not detected at 512, the process continues to 572 (e.g., to 502) to determine whether subsequent signals are received by controller 170; and to 582 (e.g., to 602) to determine whether another command was received by device 410 (e.g., player 414).

Loop control circuitry (e.g., electronic hardware, such as of an IC chip) or a loop control unit of circuit 170 may perform detecting at 512; and sending at 514 or continuing to 572 (and/or to 582).

At 522 it is determined whether a speed ON signal has been received. Determining at 522 may be circuit 170 detecting, monitoring for or otherwise receiving a signal from speed actuator 130 indicating or as a result of the actuator being activated (e.g., pressed or stepped on). If the speed ON signal is detected at 522, the process continues to 524 where control circuit 170 sends a speed control command to the media player 414.

The speed control command may be or include a first speed command, a second speed command, a third speed command, and a speed clear command. The first speed command may play the media at a first speed that is slower than a normal speed, the second speed command may play the media at a second speed that is slower than the first speed, the third speed command may play the media at a third speed that is slower than the second speed. The first speed command may be to play the media at 75% of full speed, the second speed command may be to play the media at 50%, and the third speed command may be to play the media at 35% full speed. It can be appreciated that other speeds are considered as our other numbers of speed commands. For example, two slower speeds of 60 percent and 40 percent may be used instead of the three slower speeds.

Sending the speed control commands at 524 may include control circuit 170 translating a sequence of ON signals received from the speed actuator 130 to the first, second, third and speed clear commands, and transmitting those commands to the media player. For example, the control circuit 170 may translate a first ON signal (e.g., received over time) from the speed actuator 130 to the first speed command which plays the media at a first speed that is slower than a normal speed, translates a second ON signal received from the speed actuator to the second speed command which plays the media at a second speed that is slower than the first speed, translates a third ON signal received from the speed actuator to the third speed command which plays the media at a third speed that is slower than the second speed, and translates a fourth ON signal received from the speed actuator to the speed clear command. After the fourth ON signal is received, this sequence may repeat by interpreting a fifth ON signal as the first ON signal. In some cases, it does not include the speed clear such as where the global reset at 552 is instead used to clear speed changes.

The first, second, third and fourth speed and speed clear commands may be configured to cause the media player to execute a first, second, third and speed functions that slow in time, the speed of the media being played by the media player to 75 percent, 50 percent, 35 percent and 20 percent of the normal speed of play, respectively. The speed clear command may be configured to cause the media player to execute a speed clear function that causes speed of the media being played by the media player to be 100 percent of the normal speed of play.

If the speed ON signal is not detected at 522, the process continues to 572 (e.g., to 502) to determine whether subsequent signals are received by controller 170; and to 582 (e.g., to 602) to determine whether another command was received by device 410 (e.g., player 414).

Speed control circuitry or a speed control unit of circuit 170 may perform detecting at 522; and sending at 524 or continuing to 572 (and/or to 582).

At 532 it is determined whether a skip back ON signal has been received. Determining at 532 may be circuit 170 detecting, monitoring for or otherwise receiving a signal from back actuator 134 indicating or as a result of the actuator being activated (e.g., pressed or stepped on). If the skip back ON signal is detected at 532, the process continues to 534 where control circuit 170 sends a skip back control command to the media player 414.

Sending the skip back control commands at 534 may include control circuit 170 translating each ON signal received from the skip back actuator 134 to a skip back command and transmitting that command to the media player. This command can be sent by the control circuit 170 and performed by the media player 414 while a loop and/or alternate/slow speed function is also being performed by the player. This command can be repeated by the user as desired.

The skip back command may be configured to cause the media player to execute a skip back function that causes the current location in media being played by the media player to skip backwards in time by a certain amount of time. The amount of time may be predetermined, selected and/or programmable. It may be 5 seconds. It may be another amount of time such as 3 seconds or 8 seconds.

If the control circuit 170 has sent a loop out command at 514 but has not yet sent a loop clear command, the control circuit translates skip back ON signals received from the skip back actuator to a second skip back command that skips play of the media back to the first user selected point command that was transmitted to the media player at 514. That is, if the circuit 170 has sent loop in and out commands so that the player would be currently playing a loop as noted at 514, when the circuit 170 receives a skip back ON signal, it will send a command to cause the player to skip back to the beginning of the loop.

If the skip back ON signal is not detected at 532, the process continues to 572 (e.g., to 502) to determine whether subsequent signals are received by controller 170; and to 582 (e.g., to 602) to determine whether another command was received by device 410 (e.g., player 414).

Skip back control circuitry or a skip back control unit of circuit 170 may perform detecting at 532; and sending at 534 or continuing to 572 (and/or to 582).

At 542 it is determined whether a skip forward ON signal has been received. Determining at 542 may be circuit 170 detecting, monitoring for or otherwise receiving a signal from forward actuator 138 indicating or as a result of the actuator being activated (e.g., pressed or stepped on). If the skip forward ON signal is detected at 542, the process continues to 544 where control circuit 170 sends a skip forward control command to the media player 414.

Sending the skip forward control commands at 544 may include control circuit 170 translating each ON signal received from the skip forward actuator 138 to a skip forward command and transmitting that command to the media player. This command can be sent by the control circuit 170 and performed by the media player 414 while a loop and/or alternate/slow speed function is also being performed by the player. This command can be repeated by the user as desired.

The skip forward command may be configured to cause the media player to execute a skip forward function that causes the current location in media being played by the media player to skip forward in time by a certain amount of time. The amount of time may be predetermined, selected and/or programmable. It may be 5 seconds. It may be another amount of time such as 3 seconds or 8 seconds.

If the skip forward ON signal is not detected at 542, the process continues to 572 (e.g., to 502) to determine whether subsequent signals are received by controller 170; and to 582 (e.g., to 602) to determine whether another command was received by device 410 (e.g., player 414).

Skip forward control circuitry or a skip forward control unit of circuit 170 may perform detecting at 542; and sending at 544 or continuing to 572 (and/or to 582).

At 522 it is determined whether a play/pause ON signal has been received. Determining at 512 may be circuit 170 detecting, monitoring for or otherwise receiving a signal from play/pause actuator 136 indicating or as a result of the actuator being activated (e.g., pressed or stepped on). If the play/pause ON signal is detected at 552, the process continues to 554 where control circuit 170 sends a play/pause control command to the media player 414. These commands can be repeated by the user as desired.

The play/pause control command may be or include a play command, a pause command and a global reset command. Sending the play/pause control commands at 554 may include control circuit 170 translating ON signals received from the play/pause actuator 132 to the pause command, play command and global reset command; and transmitting those commands to the media player. For example, the control circuit 170 may translate a first ON signal (e.g., received over time) from the play/pause actuator 132 to the play command, translate a second ON signal to the pause command, and translate an ON signal held for at least a threshold time to the global reset command. The threshold amount of time may be predetermined, selected and/or programmable. It may be 3 or 5 seconds. In some cases, the play/pause control commands do not include the global reset such as where the loop clear and speed clear commands are instead used to clear loops and speed changes.

The play command may be configured to cause the media player to execute a play function that begins playing (e.g., starts play) the media by the media player at the beginning or start of the media. If the media is paused, the play command may be configured to cause the media player to execute a play function that continues (e.g., restarts play) in time the media being played by the media player from the pause location. The pause command may be configured to cause the media player to execute a pause functions that pauses (e.g., stops with display showing) in time the media being played by the media player at a pause location. The global reset command may be configured to cause the media player to execute a global reset function that causes or executes the loop clear function, the speed clear function and the play function. That is, the global reset function clears any prior functions so that the media begins playing normally from its current location.

If the play/pause ON signal is not detected at 552, the process continues to 572 (e.g., to 502) to determine whether subsequent signals are received by controller 170; and to 582 (e.g., to 602) to determine whether another command was received by device 410 (e.g., player 414).

Play/pause control circuitry or a play/pause control unit of circuit 170 may perform detecting at 552; and sending at 554 or continuing to 572 (and/or to 582).

Sending a command at 514, 524, 534, 544 and 554 when an ON signal is determined to be received at 512, 522, 532, 542 and 552, respectively, may describe sending a control command upon receiving an ON signal or based on ON signals received from an actuator.

If an ON signal is not detected at any of 512, 522, 532, 542 or 552, the process continues to 572 (e.g., to 502) to determine whether subsequent signals are received by controller 170. In this case, process 500 may exclude or skip going to 582 (e.g., to 602) to determine whether a command was received by device 410 (e.g., player 414).

After 512-554, at 582 the process continues to 602 to determine whether a command sent by the device 102 and/or circuit 170 was received by device 410 (e.g., player 414). By translating the ON signals to commands and sending the commands, the device 102 and/or circuit 170 may be control the playing of media by the media player 414.

Process 500 may be performed periodically, such as tens or hundreds of times a second. In some cases, process 500 is performed once, each time an ON signal is detected at 512, 522, 532, 542 or 552.

Figure 6:
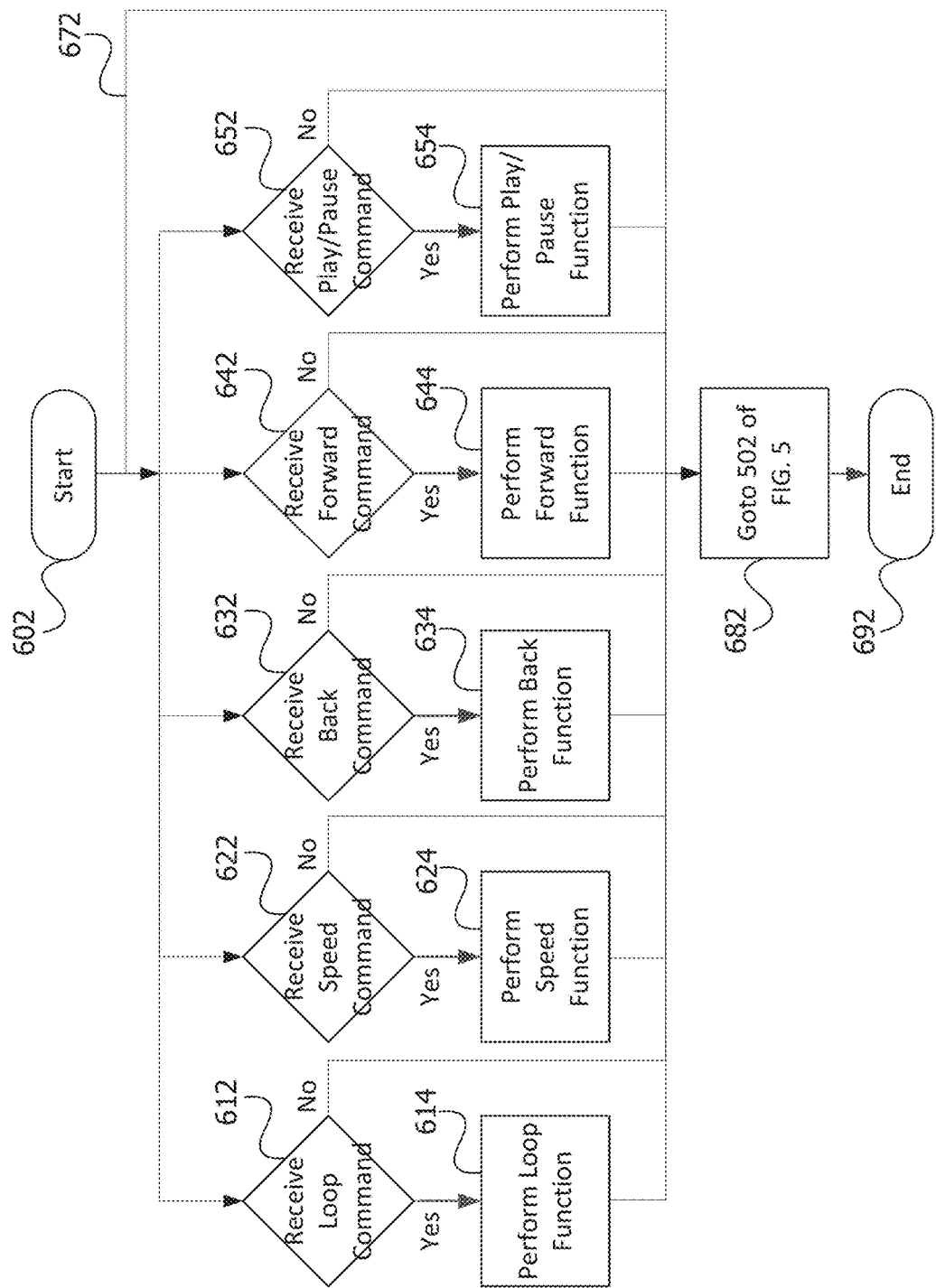
FIG. 6 is an operating environment/process for the playing of media by a media player of a computing device being controlled by a media player control device.

FIG. 6 is an operating environment/process 600 for the playing of media 412 by a media player 414 of a computing device 410 being controlled by a media player control device 102. Process 600 is performed by computing device 410. It may be performed by media player 414. Process 600 begins at 602 and ends at 692 but can optionally be repeated, such as shown by the arrow 672 going to 602. Process also goes to 502 at 682. Here, the device 102 and/or controller 170 are sending commands to computing device 410. Process 600 may be performed during or after to each time 582 and/or arrow 572 are performed.

At 612 it is determined whether a loop control command has been received. Determining at 612 may be device 410 and/or player 414 detecting, monitoring for or otherwise receiving a loop control signal from device 102 and/or circuit 170 indicating or as a result of receiving a loop actuator ON signal (e.g., actuator 132 being pressed or stepped on). If the loop control command is detected at 612, the process continues to 614 where the media player 414 performs a loop function. The loop control command may be or include a loop in command, a loop out command and a loop clear command.

The loop in command causes the media player 414 to execute a loop in point function that marks a first user selected point in time of the media, at the current location in media being played by the media player. The loop out command causes the media player to execute a loop out point function that: marks a second user selected point at the current location in the media being played by the media player, and causes the current location to loop back to the first user selected point now and each time the current location moves to the second user selected point. This may be a repetitive cycling segment of a media being played by the media player. The loop clear command causes the media player to execute a loop clear point function that removes the first and second user selected points and allows the media to play through the second user selected point.

If the loop control command is not detected at 612, the process continues to 672 (e.g., to 602) to determine whether subsequent commands are received by device 410 and/or player 414; and to 682 (e.g., to 502) to determine whether another command was sent by device 102 (e.g., circuit 170).

At 622 it is determined whether a speed control command has been received. Determining at 622 may be device 410 and/or player 414 detecting, monitoring for or otherwise receiving a speed control signal from device 102 and/or circuit 170 indicating or as a result of receiving a speed actuator ON signal (e.g., actuator 130 being pressed or stepped on). If the speed control command is detected at 622, the process continues to 624 where the media player 414 performs a speed function. The speed control command may be or include a first speed command, a second speed command, a third speed command, and a speed clear command.

The first, second, third speed and speed clear commands cause the media player to execute a first, second, third and speed functions that slow in time, the speed of the media being played by the media player to 75 percent, 50 percent and 35 percent of the normal speed of play, respectively. It can be appreciated that other speeds are considered as our other numbers of speed commands. For example, two slower speeds of 60 percent and 40 percent may be used instead of the three slower speeds. The speed clear command causes the media player to execute a speed clear function that causes speed of the media being played by the media player to be 100 percent of the normal speed of play.

If the speed control command is not detected at 622, the process continues to 672 (e.g., to 602) to determine whether subsequent commands are received by device 410 and/or player 414; and to 682 (e.g., to 502) to determine whether another command was sent by device 102 (e.g., circuit 170).

At 632 it is determined whether a skip back control command has been received. Determining at 632 may be device 410 and/or player 414 detecting, monitoring for or otherwise receiving a skip back control signal from device 102 and/or circuit 170 indicating or as a result of receiving a skip back actuator ON signal (e.g., actuator 134 being pressed or stepped on). If the skip back control command is detected at 632, the process continues to 634 where the media player 414 performs a skip back function.

The skip back command causes the media player to execute a skip backward function that causes the current location in media being played by the media player to skip back in time by a certain amount of time. The amount of time may be predetermined, selected and/or programmable. It may be 5 seconds. It may be another amount of time such as 3 seconds or 8 seconds.

In some cases, if the media player has received a loop out command at 614 but has not yet received a loop clear command at 614, the player translates skip back commands received from the device 102 and/or circuit 170 to a skip backward function that skips play of the media back to the first user selected point command that was received by the media player at 614. That is, if the player has received loop in and out commands so that the player is currently playing a loop as noted at 614, when the player receives a skip back command, it will skip back to the beginning of the loop.

If the skip back control command is not detected at 632, the process continues to 672 (e.g., to 602) to determine whether subsequent commands are received by device 410 and/or player 414; and to 682 (e.g., to 502) to determine whether another command was sent by device 102 (e.g., circuit 170).

At 642 it is determined whether a skip forward control command has been received. Determining at 642 may be device 410 and/or player 414 detecting, monitoring for or otherwise receiving a skip forward control signal from device 102 and/or circuit 170 indicating or as a result of receiving a skip forward actuator ON signal (e.g., actuator 138 being pressed or stepped on). If the skip forward control command is detected at 642, the process continues to 644 where the media player 414 performs a skip forward function.

The skip forward command causes the media player to execute a skip forward function that causes the current location in media being played by the media player to skip forward in time by a certain amount of time. The amount of time may be predetermined, selected and/or programmable. It may be 5 seconds. It may be another amount of time such as 3 seconds or 8 seconds.

If the skip forward control command is not detected at 642, the process continues to 672 (e.g., to 602) to determine whether subsequent commands are received by device 410 and/or player 414; and to 682 (e.g., to 502) to determine whether another command was sent by device 102 (e.g., circuit 170).

At 652 it is determined whether a play/pause control command has been received. Determining at 652 may be device 410 and/or player 414 detecting, monitoring for or otherwise receiving a play/pause control signal from device 102 and/or circuit 170 indicating or as a result of receiving a play/pause actuator ON signal (e.g., actuator 136 being pressed or stepped on). If the play/pause control command is detected at 652, the process continues to 654 where the media player 414 performs a play/pause function. The play/pause control command may be or include a play command, a pause command and a global reset command.

The play command causes the media player to execute a play function that begins playing the media at the beginning or restarts plays the media being played by the media player from the pause location. The pause command causes the media player to execute a pause functions that pauses (e.g., stops with display showing) in time the media being played by the media player at a pause location. The global reset command causes the media player to execute a global reset function that causes or executes the loop clear function, the speed clear function and the play function. That is, the global reset function clears any prior functions so that the media begins playing normally from its current location.

If the play/pause control command is not detected at 652, the process continues to 672 (e.g., to 602) to determine whether subsequent commands are received by device 410 and/or player 414; and to 682 (e.g., to 502) to determine whether another command was sent by device 102 (e.g., circuit 170).

Performing a function at 614, 624, 634, 644 and 654 when a command is determined to be received at 612, 622, 632, 642 and 652, respectively, may describe performing a function upon receiving a control command or based on control commands received from the controller device 102 and/or circuit 170.

If a control command is not detected at any of 612, 622, 632, 642 or 652, the process continues to 672 (e.g., to 602) to determine whether subsequent control commands are received by player 414. In this case, process 600 may also go to 682 (e.g., to 502) to determine whether device 102 will send a subsequent command to device 410 (e.g., player 414).

After 612-654, at 682 the process continues to 502 to determine whether device 102 will send a subsequent command to device 410 (e.g., player 414). By translating the commands to functions and performing those functions, the device 410 and/or player circuit 414 may be control the playing of media by the media player 414 based on the commands they received.

Process 600 may be performed periodically, such as tens or hundreds of times a second. In some cases, process 600 is performed once, each time a control command signal is detected at 612, 622, 632, 642 or 652.

Although the control device 102 and computing device 410 are explained with respect to speed, loop, back, play/pause and forward actuators, commands and playback functions, other user-definable commands may be available through hardware, firmware and software updates to the device 102 and/or browser extension of player 414. For example, the loop clear and slow clear commands (e.g., translation from ON signals to commands) may be removed, thus the global reset command can be used to clear the loop and slow playback functions. Alternatively, the global reset command can be removed, and the loop and slow clear commands maintained.

The foot-pedal embodiments can access and control all available local and online video and audio software playback functions of a media player. They can also include a hardware functionality or control circuit that is updatable via a software interface and can be programmed for non-standard playback commands such as user defined looping points and slow play speeds. They can be a hands free programmable electronic foot pedal that has both wired and wireless capability and control of all the above mentioned functions and features without the need for a secondary device.

As compared to hand-held media player controllers, the electronic foot pedal controller embodiments offer significant advantages; namely, the hands are free to engage in learning activities without the need to continually reach for and operate one or more controller devices. They control numerous standard functions such as activation of key commands as well as secondary functions such as video speed adjustment that are only found in separate hand-held controller drop-down menus or user selectable video loop points. The embodiments herein also include useful features such as wireless connectivity, updatable software interfaces and fixed hardware implementation that are generally lacking in hand-held controller devices.

For example, as compared to a hand-held device, a foot-controlled media player control device will increase engagement with and ease of use of the controller for various types of users and/or user situations. It will also eliminate the need for two separate controller devices to access all of the playback functions of media players or streaming applications, such as is required for a hand-held device.

In some cases, device 102 and/or circuitry 170 provide a way to combine and easily control media player loop and slow functions using a single foot pedal button to efficiently control each of the loop and slow functions (along with the others). The combination of the specific repetitive button pressing setup for loop and slow (and clearing) functionality along with the other functions, provides hands free, efficient, simultaneous and easy activation of loop, slow, pause, skip back and forward in a media player. This provides the great benefit of allowing the user to simultaneously control the video play while manipulating another device (e.g., computer keyboard and/or mouse) or musical instrument (e.g., musical keyboard, guitar, bass etc.).

Figure 7:
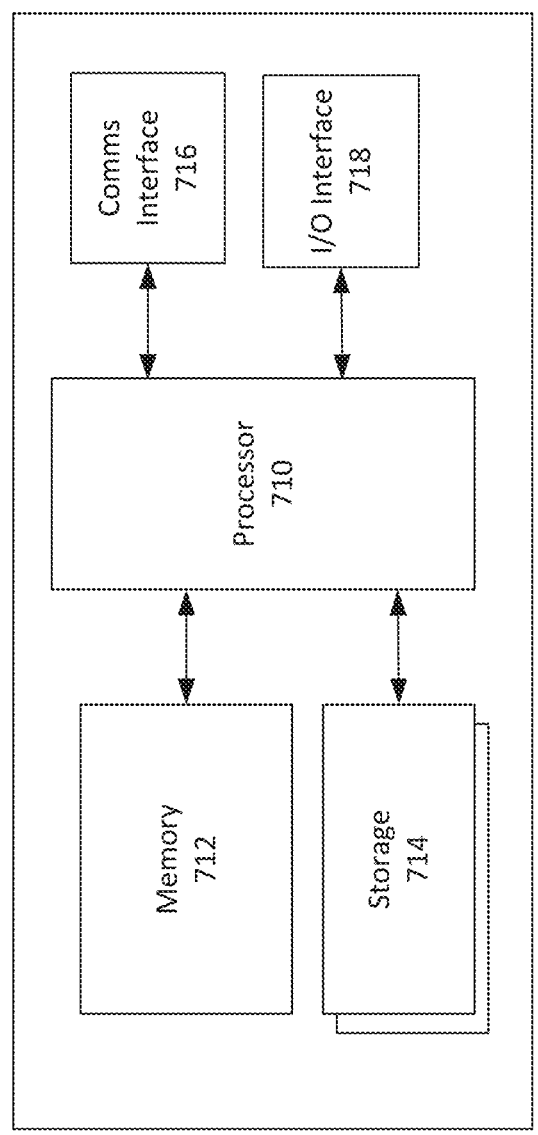
FIG. 7 is a block diagram of a computing device.

FIG. 7 is a block diagram of a computing device 700. Device 700 may be part of device 102 and/or be circuit 170. In some cases, it is control circuit 170. It may be an integrated circuit (IC) chip, a BIOS, a ROM, a desktop or laptop computer, a server computer, a tablet, a smartphone or other mobile device. The computing device 700 may include software and/or hardware for providing functionality and features described herein for controlling the playing of media 412 by a media player 414 of a computing device 410. The computing device 700 may therefore include one or more of: logic arrays, memories, analog circuits, digital circuits, software, firmware and processors. The hardware and firmware components of the computing device 700 may include various specialized units, circuits, software and interfaces for providing the functionality and features described herein. For example, an IC chip and other circuitry of device 700 may perform the functions of circuit 170.

The computing device 700 has a processor 710. The processor 710 may optionally be coupled to a memory 712 and/or storage 714. The processor 710 is coupled to a communication interface 716 and an I/O interface 718. The processor 710 may be or include one or more IC chips, BIOS, ROMs, microprocessors, field programmable gate arrays (FPGAs), application specific integrated circuits (ASICs), programmable logic devices (PLDs) and programmable logic arrays (PLAs).

The memory 712 may be or include RAM, ROM, DRAM, SRAM and MRAM, and may include firmware, such as static data or fixed instructions, BIOS, system functions, configuration data, and other routines used during the operation of the computing device 700 and processor 710. The memory 712 also provides a storage area for data and instructions associated with applications and data handled by the processor 710. As used herein the term "memory" corresponds to the memory 712 and explicitly excludes transitory media and excludes volatile media such as signals or waveforms.

The storage 714 provides non-volatile, bulk or long-term storage of data or instructions in the computing device 700. The storage 714 may take the form of a magnetic or solid state disk, tape, CD, DVD, or other reasonably high capacity addressable or serial storage medium. Multiple storage devices may be provided or available to the computing device 700. Some of these storage devices may be external to the computing device 700, such as network storage or cloud-based storage. As used herein, the terms "storage" and "storage medium" correspond to the storage 714 and explicitly exclude transitory media such as signals or waveforms. In some cases, such as those involving solid state memory devices, the memory 712 and storage 714 may be a single device.

The communication interface 716 may be or include port 150. It may be a communication interface and/or a network interface to a network such as a network that can be used to communicate control commands, calls, signals, streams, arrays, flagged samples and feedback described herein from device 102 to device 410. The interface 716 may be USB, wired or wireless.

The I/O interface 718 interfaces the processor 710 to actuators 130-138. It optionally interfaces process 710 to other peripherals (not shown) such as displays, video and still cameras, microphones, keyboards and USB devices.

In some cases, storage 714 is a non-volatile machine-readable storage medium that includes all types of computer readable media, including magnetic storage media, optical storage media, and solid state storage media. It should be understood that the software can be installed in and sold with the device 700. Alternatively, the software can be obtained and loaded into the device 700, including obtaining the software via a disc medium or from any manner of network or distribution system, including from a server owned by the software creator or from a server not owned but used by the software creator. The software can be stored on a server for distribution over the Internet.

Some technologies described for the control circuit 170 and/or computing device 700 may include numerous circuitry and/or units including: loop control circuitry configured to send loop control commands to the media player upon receiving ON signals from a loop actuator, wherein the loop control commands include a loop in command and a loop out command; speed control circuitry configured to send speed control commands to the media player upon receiving ON signals from a speed actuator, wherein the speed control commands include a first speed command, a second speed command and a third speed command; play/pause control circuitry configured to send play/pause control commands to the media player upon receiving ON signals from a play/pause actuator, wherein the play/pause control commands include a pause command and a play command; skip back control circuitry configured to send a skip backward command to the media player upon receiving an ON signal from a skip backward actuator; and/or skip forward control circuitry configured to send a skip forward command to the media player upon receiving an ON signal from a skip forward actuator.

The technologies described herein provide various technological improvements to computer performance and efficiently. For example, the control device 102, circuit 170 and/or the process 500 provide a much more accurate and efficient device and/or process for controlling the playing of media 412 by a media player 414 of a computing device 410. For example, the technologies described are technological improvements over those of the past because they: (1) allow a user to hands free and easily setup a loop for media being played; (2) allow a user to hands free and easily more accurately select the timing of the beginning and end points of the loop for playing the media; (3) allow a user to hands free and easily skip to the beginning point of the loop for playing the media; (4) allow a user to hands free and easily setup various slower speeds for playing the media; (5) allow a user to hands free and easily clear or global reset the slower speeds and loop. Prior technologies do have such improvements.

Within this description, the term "computing device" may mean a collection of hardware, which may be augmented by firmware and/or software, that performs the described functions. An engine may typically be designed using a hardware description language (HDL) that defines the engine primarily in functional terms. The HDL design may be verified using an HDL simulation tool. The verified HDL design may then be converted into a gate netlist or other physical description of the engine in a process commonly termed "synthesis". The synthesis may be performed automatically using a synthesis tool. The gate netlist or other physical description may be further converted into programming code for implementing the engine in a programmable device such as a field programmable gate array (FPGA), a programmable logic devices (PLD), or a programmable logic arrays (PLA). The gate netlist or other physical description may be converted into process instructions and masks for fabricating the engine within an application specific integrated circuit (ASIC).

Within this description, the term "unit" also means a collection of hardware, firmware, and/or software, which may be on a smaller scale than a "computing device". For example, a computing device may contain multiple units, some of which may perform similar functions in parallel. The terms "computing device" and "unit" do not imply any physical separation or demarcation. All or portions of one or more units and/or computing devices may be collocated on a common card, such as a network card, or within a common FPGA, ASIC, or other circuit device.

Although shown implemented in a personal computer, the processes and apparatus may be implemented with any computing device. A computing device as used herein refers to any device with a processor, memory and a storage device that may execute instructions including, but not limited to, personal computers, server computers, computing tablets, set top boxes, video game systems, personal video recorders, telephones, personal digital assistants (PDAs), portable computers, and laptop computers. These computing devices may run an operating system, including variations of the Linux, Microsoft Windows, Symbian, and Apple Mac operating systems.

The techniques may be implemented with machine readable storage media in a storage device included with or otherwise coupled or attached to a computing device. That is, the software may be stored in electronic, machine readable media. These storage media include magnetic media such as hard disks, optical media such as compact disks (CD-ROM and CD-RW) and digital versatile disks (DVD and DVD±RW); flash memory cards; and other storage media. As used herein, a storage device is a device that allows for reading and/or writing to a storage medium. Storage devices include hard disk drives, DVD drives, flash memory devices, and others.

The determiner may include a processor and/or a determiner unit. These units may be hardware, software, firmware, or a combination thereof. Additional and fewer units, modules or other arrangement of software, hardware and data structures may be used to achieve the processes and apparatuses described herein.

Closing Comments

Throughout this description, the technologies described and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one technology are not intended to be excluded from a similar role in other technologies.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A foot pedal control device for controlling a media player that plays video media on a computing device, the media player control device comprising:
   a control circuit coupled to a loop actuator, a speed actuator, a play/pause actuator, a skip back actuator and a skip forward actuator that are located in a pattern to be stepped on and that are configured to be activated by being stepped on:
   the control circuit sends loop control commands to the media player upon receiving ON signals from the loop actuator, wherein the loop control commands include a loop in command, a loop out command and a loop clear command;
   the control circuit sends speed control commands to the media player upon receiving ON signals from the speed actuator, wherein the speed control commands include a first speed command, a second speed command, a third speed command, and a speed clear command;
   the control circuit sends play/pause control commands to the media player upon receiving ON signals from the play/pause actuator, wherein the play/pause control commands include a pause command, a play command and a global reset command;
   the control circuit sends a skip backward command to the media player upon receiving an ON signal from the skip backward actuator; and
   the control circuit sends a skip forward command to the media player upon receiving an ON signal from the skip forward actuator;
   wherein the control circuit translates a first ON signal of a sequence of ON signals received from the play/pause actuator to the pause command, translates a second ON signal of the sequence of ON signals received from the play/pause actuator to the play command, and translates an ON signal held for at least a threshold time received from the play/pause actuator to the global reset command.

2. The foot pedal control device of claim 1, wherein the control circuit translates a first ON signal received from the loop actuator to the loop in command, translates a second ON signal received from the loop actuator to the loop out command, and translates a third ON signal received from the loop actuator to the loop clear command.

3. The foot pedal control device of claim 1, wherein the control circuit translates a first ON signal received from the speed actuator to the first speed command which plays the media at a first speed that is slower than a normal speed, translates a second ON signal received from the speed actuator to the second speed command which plays the media at a second speed that is slower than the first speed, translates a third ON signal received from the speed actuator to the third speed command which plays the media at a third speed that is slower than the second speed, and translates a fourth ON signal received from the speed actuator to the speed clear command.

4. The foot pedal control device of claim 1, wherein the control circuit translates ON commands received from the skip backward actuator to the skip backward command that is transmitted to the media player; and wherein the control circuit translates ON commands received from the skip forward actuator to the skip forward command that is transmitted to the media player.

5. The foot pedal control device of claim 1, further comprising:
   a housing shaped as a foot pedal device for positioning on a floor surface;
   the loop, speed, play/pause, skip back and skip forward actuators mounted in a top surface of the housing;
   the control circuit disposed within the housing;
   a communication port for sending the control commands from the control circuit to the media player using one of a USB connection or wireless technology.

6. A foot pedal control device for controlling a media player that plays video media on a computing device, the media player control device comprising:
   a control circuit coupled to a loop actuator, a speed actuator, a play/pause actuator, a skip back actuator and a skip forward actuator that are located in a pattern to be stepped on and that are configured to be activated by being stepped on:
   the control circuit sends loop control commands to the media player upon receiving ON signals from the loop actuator, wherein the loop control commands include a loop in command, a loop out command and a loop clear command;
   the control circuit sends speed control commands to the media player upon receiving ON signals from the speed actuator, wherein the speed control commands include a first speed command, a second speed command, a third speed command, and a speed clear command;
   the control circuit sends play/pause control commands to the media player upon receiving ON signals from the play/pause actuator, wherein the play/pause control commands include a pause command, a play command and a global reset command;
   the control circuit sends a skip backward command to the media player upon receiving an ON signal from the skip backward actuator; and
   the control circuit sends a skip forward command to the media player upon receiving an ON signal from the skip forward actuator;
   further comprising the media player, wherein:
   upon the media player receiving the loop in command, the media player executing a loop in point function that marks a first user selected point in time at the current location in media being played by the media player,
   upon the media player receiving the loop out command, the media player executing a loop out point function that:

marks a second user selected point at the current location in the media being played by the media player, causes the current location to loop back to the first user selected point now from the second user selected point and each time the current location moves to the second user selected point;

upon the media player receiving the loop clear command, the media player executing a loop clear point function that removes the first and second user selected points and allows the media to play through the second user selected point;

upon the media player receiving the first, second, third speed and speed clear commands, the media player executing a first speed function that slows the speed of the media being played by the media player to 75 percent, 50 percent, 35 percent and 100 percent of the normal speed of play, respectively;

upon the media player receiving the pause command, the media player executing a pause function that pauses the media being played by the media player at a pause location;

upon the media player receiving the play command, the media player executing a play function that one of begins playing the media at the beginning or restarts plays the media being played by the media player from the pause location;

upon the media player receiving the global reset command, the media player executing a global reset function that executes the loop clear function, the speed clear function and the play function;

upon the media player receiving the skip backward command, the media player executing a skip backward function that causes the current location in media being played by the media player to skip back in time by a certain amount of time; and upon the media player receiving the skip forward command, the media player executing a skip forward function that causes the current location in media being played by the media player to skip forward in time by a certain amount of time.

7. A media player control circuit for controlling a media player that plays video media on a computing device, the media player control circuit comprising:

loop control circuitry configured to send loop control commands to the media player upon receiving ON signals from a loop actuator, wherein the loop control commands include a loop in command and a loop out command;

speed control circuitry configured to send speed control commands to the media player upon receiving ON signals from a speed actuator, wherein the speed control commands include a first speed command, a second speed command and a third speed command; and play/pause control circuitry configured to send play/pause control commands to the media player upon receiving ON signals from a play/pause actuator, wherein the play/pause control commands include a pause command and a play command;

wherein the loop actuator, speed actuator and play/pause actuator are located in a pattern to be stepped on and that are configured to be activated by being stepped on;

wherein the loop control commands include a loop clear command and the speed control commands include a speed clear command; or wherein the play/pause control commands include a global reset command; and wherein the control circuit translates a first ON signal of a sequence of ON signals received from the play/pause actuator to the pause command, translates a second ON signal of the sequence of ON signals received from the play/pause actuator to the play command, and translates an ON signal held for at least a threshold time received from the play/pause actuator to the global reset command.

8. The media player control circuit of claim 7, further comprising:

skip back control circuitry configured to send a skip backward command to the media player upon receiving an ON signal from a skip backward actuator; and skip forward control circuitry configured to send a skip forward command to the media player upon receiving an ON signal from a skip forward actuator.

9. The media player control circuit of claim 7, wherein the control circuit translates a first ON signal received from the loop actuator to the loop in command, translates a second ON signal received from the loop actuator to the loop out command, and translates a third ON signal received from the loop actuator to the loop clear command.

10. The media player control circuit of claim 7, wherein the control circuit translates a first ON signal received from the speed actuator to the first speed command which plays the media at a first speed that is slower than a normal speed, translates a second ON signal received from the speed actuator to the second speed command which plays the media at a second speed that is slower than the first speed, translates a third ON signal received from the speed actuator to the third speed command which plays the media at a third speed that is slower than the second speed, and translates a fourth ON signal received from the speed actuator to the speed clear command.

11. A method for media player control of playing of media by a media player that plays video media on a computing device, the method comprising:

sending loop control commands to the media player upon receiving signals from a loop actuator; wherein the loop control commands include a loop in command, a loop out command and a loop clear command;

sending speed control commands to the media player upon receiving signals from a speed actuator; wherein the speed control commands include a first speed command, a second speed command, a third speed command, and a speed clear command;

sending play/pause control commands to the media player upon receiving signals from a play/pause actuator; wherein the play/pause control commands include a pause command, a play command and a global reset command;

sending a skip backward command to the media player upon receiving signals from a skip backward actuator; and sending a skip forward command to the media player upon receiving signals from a skip forward actuator;

wherein the loop actuator, speed actuator, play/pause actuator, skip backward actuator and skip forward actuator are located in a pattern to be stepped on and that are configured to be activated by being stepped on; and translating a first ON signal of a sequence of ON signals received from the play/pause actuator to the pause command, translating a second ON signal of the sequence of ON signals received from the play/pause actuator to the play command, and translating an ON signal held for at least a threshold time received from the play/pause actuator to the global reset command.

12. The method of claim 11, further comprising:
translating a first ON signal received from the loop actuator to the loop in command, translating a second ON signal received from the loop actuator to the loop out command, and translating a third ON signal received from the loop actuator to the loop clear command.

13. The method of claim 11, further comprising:
translating a first ON signal received from the speed actuator to the first speed command which plays the media at a first speed that is slower than a normal speed, translates a second ON signal received from the speed actuator to the second speed command which plays the media at a second speed that is slower than the first speed, translates a third ON signal received from the speed actuator to the third speed command which plays the media at a third speed that is slower than the second speed, and translates a fourth ON signal received from the speed actuator to the speed clear command.

14. The method of claim 11, further comprising:
translating ON commands received from the skip backward actuator to the skip backward command that is transmitted to the media player; and
translating ON commands received from the skip forward actuator to the skip forward command that is transmitted to the media player.

15. The method of claim 11, further comprising:
sending the control commands from the control circuit to the media player using one of a USB connection or wireless technology.

16. A method for media player control of playing of media by a media player that plays video media on a computing device, the method comprising:
sending loop control commands to the media player upon receiving signals from a loop actuator; wherein the loop control commands include a loop in command, a loop out command and a loop clear command;
sending speed control commands to the media player upon receiving signals from a speed actuator; wherein the speed control commands include a first speed command, a second speed command, a third speed command, and a speed clear command;
sending play/pause control commands to the media player upon receiving signals from a play/pause actuator; wherein the play/pause control commands include a pause command, a play command and a global reset command;
sending a skip backward command to the media player upon receiving signals from a skip backward actuator; and
sending a skip forward command to the media player upon receiving signals from a skip forward actuator;

wherein the loop actuator, speed actuator, play/pause actuator, skip backward actuator and skip forward actuator are located in a pattern to be stepped on and that are configured to be activated by being stepped on:
upon the media player receiving the loop in command, the media player executing a loop in point function that marks a first user selected point in time at the current location in media being played by the media player,
upon the media player receiving the loop out command, the media player executing a loop out point function that:
marks a second user selected point at the current location in the media being played by the media player,
causes the current location to loop back to the first user selected point now from the second user selected point and each time the current location moves to the second user selected point;
upon the media player receiving the loop clear command, the media player executing a loop clear point function that removes the first and second user selected points and allows the media to play through the second user selected point;
upon the media player receiving the first, second, third speed and speed clear commands, the media player executing a first speed function that slows the speed of the media being played by the media player to 75 percent, 50 percent, 35 percent and 100 percent of the normal speed of play, respectively;
upon the media player receiving the pause command, the media player executing a pause function that pauses the media being played by the media player at a pause location;
upon the media player receiving the play command, the media player executing a play function that one of begins playing the media at the beginning or restarts plays the media being played by the media player from the pause location;
upon the media player receiving the global reset command, the media player executing a global reset function that executes the loop clear function, the speed clear function and the play function;
upon the media player receiving the skip backward command, the media player executing a skip backward function that causes the current location in media being played by the media player to skip back in time by a certain amount of time; and
upon the media player receiving the skip forward command, the media player executing a skip forward function that causes the current location in media being played by the media player to skip forward in time by a certain amount of time.

* * * * *